Figure 1:
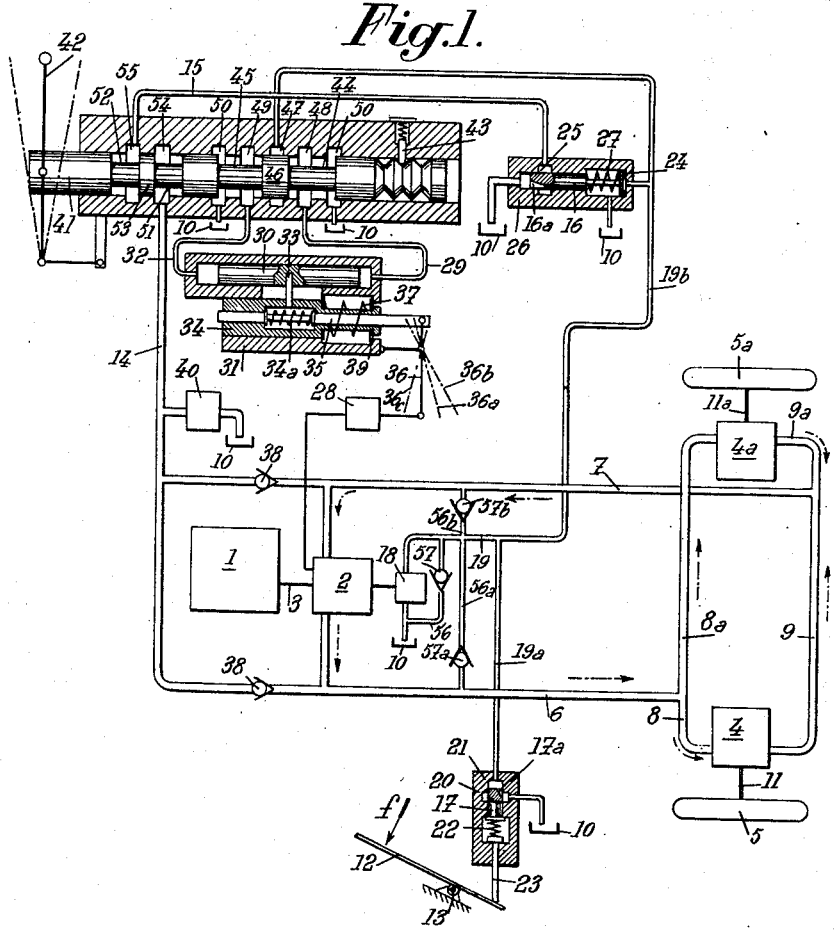

June 1, 1965

L. PIGNOLET ETAL 3,186,162

PRIME MOVER SYSTEMS

Filed Sept. 10, 1963

INVENTOR
Louis Pignolet
François Dumas
BY
Bailey, Stephens & Huettig
ATTORNEYS

United States Patent Office 3,186,162
Patented June 1, 1965

3,186,162
PRIME MOVER SYSTEMS
Louis Pignolet, Lyon, and François Dumas, Villeurbanne, France, assignors to Societe Industrielle Generale de Mecanique Appliquee S.I.G.M.A., Paris, France, a society of France
Filed Sept. 10, 1963, Ser. No. 307,825
2 Claims. (Cl. 60—19)

This invention relates to prime mover systems of the kind comprising an internal combustion engine (of the explosion or gradual combustion kind) and a hydrostatic transmission comprising a variable-delivery generating device (or pump) driven by said engine, at least one receiving device (or hydraulic motor) mechanically coupled with a driven element, and a delivery duct and a return duct arranged as a closed circuit (main circuit) between the generating and receiving devices. Amongst such prime mover systems, the invention relates more particularly—as being the case where the invention seems likely to be most advantageous—but not exclusively to those which are used in motor vehicles, in which event the driven element is a driving wheel or a group of driving wheels of the vehicle.

In a French patent application filed by the French firm S.I.G.M.A. and with the same title as the present application, on April 28, 1962, a discharge duct comprising a progressive throttling element controlled by the heat engine accelerator control is connected to the delivery duct of prime mover systems of the kind specified.

It is an object of this invention to improve the practical performance of systems of the kind specified and inter alia to improve their simplicity and reliability of operation. According to the invention, therefore, in systems of the kind specified means responsive to the position of the acceleration control are adapted, when the same is moved to increase the supply of fuel to the internal combustion engine, to progressively close the throttling —i.e., to progressively decrease that proportion of the delivery of the generating device which is bypassed through the discharge duct and removed from the receiving device—and to increase the unit delivery (per revolution of the heat engine) of the generating device from a zero value corresponding to stoppage of the driven element to a maximum value. Advantageously, the means responsive to the position of the throttle control are responsive to the pressure of a fluid flowing in an auxiliary circuit comprising a pressure fluid source, such as a constant-unit-delivery hydraulic pump driven by the heat engine, and a second gradual throttling element which controls a leak in the auxiliary circuit and which is so controlled by the acceleration control that the pressure in the auxiliary circuit varies with movement of the acceleration control.

Figure 2:
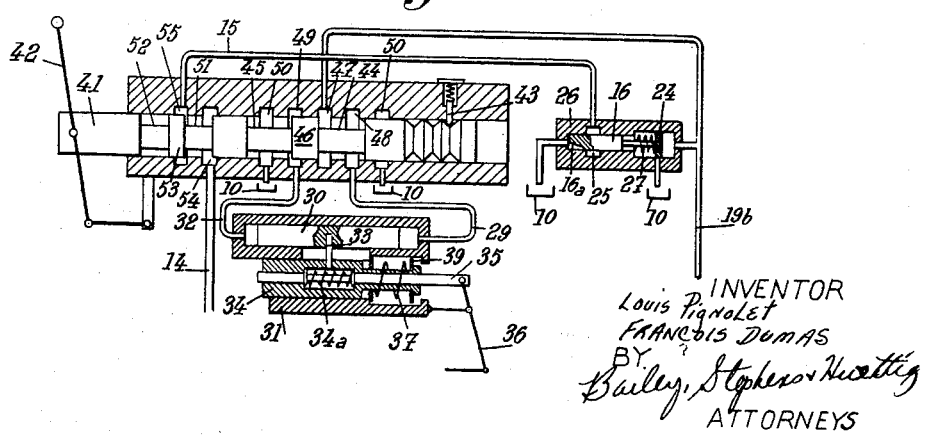

For a better understanding of the invention and to show how the same may be carried into effect, reference may now be made to the accompanying drawings wherein:

FIGURE 1 is a diagrammatic view with some parts shown sectioned of a prime mover system according to the invention, in the position in which the driven element (group of driving wheels) is locked, and FIGURE 2 shows part of the same installation in the position for forwards travel.

The system according to the invention mainly comprises an internal combustion engine 1 and a hydrostatic transmission comprising: a pump 2 driven by the shaft 3 of engine 1; two hydraulic motors, 4, 4a each mechanically coupled with a driving wheel 5, 5a of the vehicle; and a delivery duct 6 and return duct 7 arranged as a closed circuit between the pump 2 and the two hydraulic motors 4, 4a. As will be described hereinafter, the duct 6 is used for the pump delivery—and the duct 7 for the return of liquid—only when the vehicle travels forwards, and the functions of the ducts 6, 7, are changed over for reverse drive.

As the drawings show, the two receiving devices 4, 4a are supplied in parallel by two branches 8, 8a of the delivery duct 6 and deliver in parallel to two branches 9, 9a of the return duct 7. The normal flow direction of the driving liquid in the main circuit—i.e., for forwards travel of the vehicle—is diagrammatically illustrated by chain-dotted line arrows in FIGURE 1. There is of course no such flow when the wheels are in the locked state illustrated in FIGURE 1. Leakages of the driving liquids can be made up from a reservoir 10 which is shown in several places of the drawings to simplify the same. Alternatively, the hydraulic motor 4a and the two branches 8a, 9a can be obviated and the two wheels 5, 5a can be driven by the same hydraulic motor 4.

To provide a variable-ratio transmission, the pump 2 is so devised that its delivery volume per revolution of its driving shaft 3 can be varied from zero to a maximum. This feature is familiar to the engineers in the art. If required, the hydraulic motors 4, 4a can also be so devised that the volume which they receive per revolution of their driven shafts 11, 11a respectively can be varied.

To enable the vehicle driver to adjust the torque developed by the engine 1, he has at his disposal a throttle pedal 12 connected by linkage (not shown) to the supply system of internal combustion engine 1. The pedal 12, which can pivot around a spindle 13, is moved in the direction indicated by an arrow $f$ (FIG. 1) to increase the rate of fuel supply to the engine 1. A discharge, or spill duct 14, 15, is connected to the delivery duct 6. The spill duct 14, 15 comprises a throttling valve 16 responsive to displacement of pedal 12. According to the invention, means responsive to the position of pedal 12 so act, when the pedal 12 is moved in the direction indicated by the arrow $f$ (FIG. 1), as to progressively close the throttling valve 16 and to increase the delivery per cycle of pump 2 from the zero value corresponding to stoppage of the wheels 5, 5a to a maximum value. Advantageously, the means responsive to the position of the pedal 12 are responsive to the pressure of a fluid flowing in an auxiliary circuit comprising a pressure fluid source and a spill control throttling valve 17 in said auxiliary circuit which is so controlled by the pedal 12 that the pressure in the auxiliary circuit varies with movement of the pedal 12.

As the drawings show, the auxiliary pressure fluid source can take the form of an auxiliary pump 18 having a constant delivery per cycle which is driven by the engine shaft 3 and which sucks liquid in from reservoir 10 or from an auxiliary reservoir. The delivery duct 19 of pump 18 comprises a first branch 19a which delivers to reservoir 10 via a passage controlled by the throttling valve 17. The same is, for instance, a sliding valve formed with at least one groove 17a of progressive depth and co-operating with a groove 20 in a stationary member 21. The throttling valve 17 is loaded against the pressure of the liquid supplied via the branch 19a by a spring 22 which tends to close the valve 17 and whose force is controlled by the pedal 12 via a tappet or rod or cam or the like 23 so that the delivery pressure of the pump 18 increases in proportion as pedal 12 is moved in the direction indicated by the arrow $f$.

In order that the throttling valve 16 may respond to the delivery pressure of the pump 18 a second branch 19b of the delivery duct 19 of the auxiliary circuit extends to one face of a piston 24 rigidly secured to the member 16 which, like the member 17, can be a sliding valve formed with at least one groove 16a of progressive depth and co-operating with the groove 25 in a stationary member 26. The throttling member 16 is urged, against the pressure of the liquid supplied via the branch 19b and operative on the piston 24, by a spring 27 which tends to open the member 16.

The pump 2 is fitted with means 28 adapted to vary its delivery per cycle. In order that the same may respond to the pressure in the branch 19b, such pressure acts through a duct 29 against one face of a piston 30 slidable in a stationary member 31, the other face of the piston 30 normally being connected to discharge through a duct 32. The piston 30 is rigidly connected, for example, by a finger 33, to a sliding sheath 34 which is connected to the means 28 via a rod 35 connected thereto by a lever 36, the rod 35 being moved by the sheath 34 preferably by means of a spring 34a. A spring 37 tends to move the lever 36 to the solid-line position in FIGURE 1, in which position the means 28 cause the pump 2 to have zero delivery, the spring 37 opposing the pressure of the auxiliary circuit as transmitted to the piston 30 through the duct 29.

With the system so far described, the wheels 5, 5a can be driven only in one direction — i.e., for forwards travel —such direction being the one for which the duct 6 serves as delivery duct and the duct 7 serves as return duct (direction of chain-dotted arrows in FIG. 1). In order that the system according to the invention may also rotate the wheels 5, 5a backwards, the conventional return duct 7 as well as the conventional delivery duct 6 is connected via check valves 38 to the discharge or spill duct 14, 15, and a distributor is provided between the branch 19b of the auxiliary circuit and the ducts 29, 32; such distributor can either connect the branch 19b to the duct 29 and the duct 32 to the reservoir 10 as hereinbefore described (forwards travel, FIG. 2) or connect the branch 19b to the duct 32 and the duct 29 to the reservoir 9 (reverse travel). Also, the spring 37 is adapted to return the sheath 34 to the central position shown in FIGURE 1, to which end the spring 37 is disposed in known manner between discs or washers or the like 39 which bear either against the sheath 34 or against the member 31, depending upon the required direction of travel.

Advantageously, the distributor hereinbefore referred to also has a neutral or stop position (FIG. 1) in which it isolates the first section 14 of the spill duct 14, 15 from the throttling member 16, the section 14 being protected by a relief valve 40, and also isolates the branch 19b of the auxiliary circuit from the piston 30. To this end, and as shown in the drawings, a distributor can be used which has a sliding valve 41 operated by a lever 42 and adapted to be located in any of its three operative positions by a spring-loaded tappet or the like 43. The valve 41 is formed with two grooves 44, 45 which are separated from each other by a bearing surface 46 and which co-operate with a groove 47 extending to the branch 19b; the valve 41 is also formed with a groove 49 connected to the duct 32 and with two grooves 50 connected to the reservoir 10. Consequently, when the distributor is in its central position as shown in FIGURE 1, the bearing surface 46 isolates the groove 47 and the grooves 48, 49 and the grooves 44, 45 connect the ducts 29, 32 to the reservoir 10 via the grooves 50. In the position for forwards travel shown in FIGURE 2, the distributing groove 44 connects the branch 19b to the duct 29 via the grooves 47, 48, while the duct 32 is connected to the reservoir 10 via the groove 49 and a groove 50. For reverse travel, the distributor groove 45 connects the branch 19b to the duct 32 via the grooves 47, 49, while the duct 29 is connected to the reservoir 10 via the groove 48 and a groove 50.

Valve 41 is also formed with two grooves 51, 52 which are separated from each other by a bearing surface 53 and which co-operate with a groove 54 connected to the upstream section 14 of the spill duct 14, 15 and to a groove 55 connected to the downstream section 15 of the spill duct 14, 15. When the valve is in the central position shown in FIGURE 1, the surface 53 isolates the two grooves 54 and 55—and therefore the two sections of spill duct 14, 15—and when the valve is in its other two positons, continuity between the two sections of the discharge duct 14, 15 is provided either by the groove 51 (FIG. 2) or by the groove 52.

In order that the vehicle may be towed backwards or forwards with its engine 1 stopped, the delivery duct 6 or 7 is connected, beyond the check valves 57a, 57b provided for normal operation, to the reservoir 10 via a check valve 57.

The prime mover system thus provided operates as follows:

When the distributor valve 41 is in the central position illustrated in FIGURE 1, the two ducts 29, 32 are connected to the reservoir 10 without pressure and the sheath 34 is maintained in the neutral position by the spring 37. The means 28 reduce the delivery of the generating device 2 to zero. The hydraulic motors 4, 4a, and the wheels 5, 5a are locked and the vehicle is stationary. Engine 1 can be started and so drive the pump 2 (at zero delivery) and the pump 18, the vehicle continuing to remain stationary. The pump 18 delivers to reservoir 10 through the throttling member 17. Operation of the accelerator pedal 12 has no effect since the auxiliary circuit supplied by the pump 18 is isolated by the bearing surface 46 of the valve 41.

To make the vehicle start gradually forwards, the driver places the distributor lever 42 to the position illustrated in FIGURE 2 where such lever is maintained by the device 43. The oil delivered by the pump 18 flows through the duct 19 via the branch 19a to the throttling spill valve 17 which maintains the oil under pressure, and also, via the branch 19b and the grooves 44, 47, 48 and the duct 29, to the right-hand face of the piston 30. The other face of the piston is kept at zero pressure by the grooves 45, 49 and 50. The main circuit is then connected to reservoir 10 by valve 38, discharge duct 14, 15 and throttling valve 16. The driver then gradually depresses the pedal 12, with the result that the force of the spring 22 calibrating the throttling valve 17 increases. The pressure therefore gradually rises in the auxiliary circuit supplied by pump 18. The pressurised oil first moves the piston 30, the sheath 34 and the rod 35 to the left in FIGURE 2 against the spring 37. Rod 35 tilts lever 36 from the solid-line position illustrated in FIGURE 1 to position 36a and then to position 36b, so that the delivery of the pump 2 increases gradually from zero. The pump 2 delivers to the throttling valve 16. The pressure of the auxiliary circuit therefore increases and, by appropriate calibration of the springs 37, 27, the throttling valve 16 closes, so that that proportion of the delivery of the pump 2 which was originally bypassed to the throttling member 16 drops to zero and passes with the remainder of the delivery of the pump 2 to the hydraulic motors 4, 4a, the total delivery of the pump 2 increasing simultaneously because the piston 30 continues to move. The vehicle therefore starts gradually. In normal operation any extra action on the pedal 12 increases the vehicle speed by accelerating the engine and increasing the transmission ratio between the pump 2 and the hydraulic motors 4, 4a.

When the driver lifts his foot off the pedal 12, the spring 22 slackens, the pressure drops in the auxiliary circuit and in a first phase the piston 30 is returned to its central position by the spring 37, with a progressive reduction of the unit delivery of the pump 2. In a second phase, which occurs when the engine 1 is running just fast enough not to stall—so that there is some pressure in the auxiliary circuit—the throttling valve 16 opens and releases the spill duct 14, 15 of the main circuit a little before the delivery of the pump 2 drops to zero— i.e., before the vehicle is locked by the hydraulic motors 4, 4a. The vehicle therefore stops gradually without the engine 1 stalling. The rate of flow through the throttling valve 16 is always very reduced since the same closes when the delivery of the pump 2 is adjusted down to substantially zero by the means 28.

To gradually start and gradually stop the vehicle in reverse, valve 41 is moved to the right in FIGURE 1, with the result that the piston 30, sheath 34 and rod 35 move to the right, and the lever 36 takes up a position near the position denoted by the reference 36c in FIGURE 1. The functions of the ducts 29, 32 are changed over, et sim., the ducts 6, 7, the direction of flow in the main circuit then being the reverse of what is indicated by the chain-dotted arrows in FIGURE 1. Apart from this, operation of the system and the advantages provided thereby are just the same as has been described with reference to forwards travel.

For the vehicle to be towed with its engine 1 stopped, the valve 41 is moved either to the forwards or reverse position. The wheels 5, 5a drive the hydraulic motors 4, 4a, then acting as pumps, which deliver liquid through the duct 7 (or 6), the spill duct 14, 15 and the throttling valve 16. The liquid sucked in through the other channel 6 (or 7) is taken from the reservoir 10 through the ducts 56a (or 56b) and 56 and the valves 57a (or 57b) and 57. The vehicle can then be towed but with a braking effect provided by the throttling valve 16. This braking effect is useful since it keeps the tow-rope taut.

The invention provides gradual starting of a vehicle in either direction of travel, progressive and smooth stoppage, optional locking of the wheels when the vehicle is stationary, automatic declutching before vehicle speed drops to a level at which the engine may stall, and towing facilities in emergencies.

Of course, and as the foregoing shows, the invention is not limited to those of its forms of application nor to those embodiments of its various parts which have been more particularly considered but covers all the variants.

What we claim is:

1. A power plant for actuating a driven member which comprises, in combination: an internal combustion engine, a throttle control member for said engine, at least one main pump driven by said engine, said pump being adjustable so that its delivery per cycle thereof can vary from zero to a maximum, means for controlling the delivery of said pump per cycle thereof, at least one hydraulic motor, operatively connected to the driven member to be actuated by the power plant, a main hydraulic circuit connecting the input of sad hydraulic motor with the delivery of said pump and the output of said hydraulic motor with the input of said pump, a spill circuit branching off from said main hydraulic circuit, a gradual throttling valve in said spill circuit, and means responsive to variations of position of said throttle control member for closing said throttling valve when said throttle control member is moved in the direction producing an increase of the feed rate of fuel to said internal combustion engine and simultaneously operating said means for controlling the delivery of said pump per cycle thereof so as to increase said delivery.

2. A power plant for actuating a driven member which comprises, in combination: an internal combustion engine, a throttle control member for said engine, at least one main pump driven by said engine, said pump being adjustable so that its deliver per cycle thereof can vary from zero to a maximum, means for controlling the delivery of said pump per cycle thereof, at least one hydraulic motor, operatively connected to the driven member to be actuated by the power plant, a main hydraulic circuit connecting the input of said hydraulic motor with the delivery of said pump and the output of said hydraulic motor with the input of said pump, a spill circuit branching off from said main hydraulic circuit, a gradual throttling valve in said spill circuit, an auxiliary pump, having a constant delivery per cycle, operatively connected with said internal combustion engine to be driven by it, a source of liquid connected to the input of said auxiliary pump, an auxiliary circuit connected to the input of said auxiliary pump, an auxiliary circuit connected with the delivery of said auxiliary pump, a spill valve for said auxiliary circuit operatively connected with said throttle control member for closing more and more as said control member is actuated to accelerate more and more said internal combustion engine, hydraulic control means operative by the liquid pressure in said auxiliary circuit for controlling said throttling valve to close it more and more as the pressure in said auxiliary circuit increases, hydraulically controlled means for operating said means for controlling the delivery of said first mentioned pump per cycle thereof, and manually operated valve means for controlling the connection of said auxiliary circuit with said hydraulically controlled means, said valve means being adapted, in one position thereof, to cut off the connection between said auxiliary circuit and said hydraulically controlled means and, in another position thereof, to connect said auxiliary circuit with said hydraulically controlled means.

References Cited by the Examiner
UNITED STATES PATENTS

| Re. 19,681 | 8/35 | Hayes | 60—52 |
| 1,774,836 | 9/30 | Lormuller | 60—52 |
| 2,941,365 | 6/60 | Carlson et al. | 60—52 |

JULIUS E. WEST, *Primary Examiner.*

EDGAR W. GEOGHEGAN, *Examiner.*